Patented Jan. 2, 1951

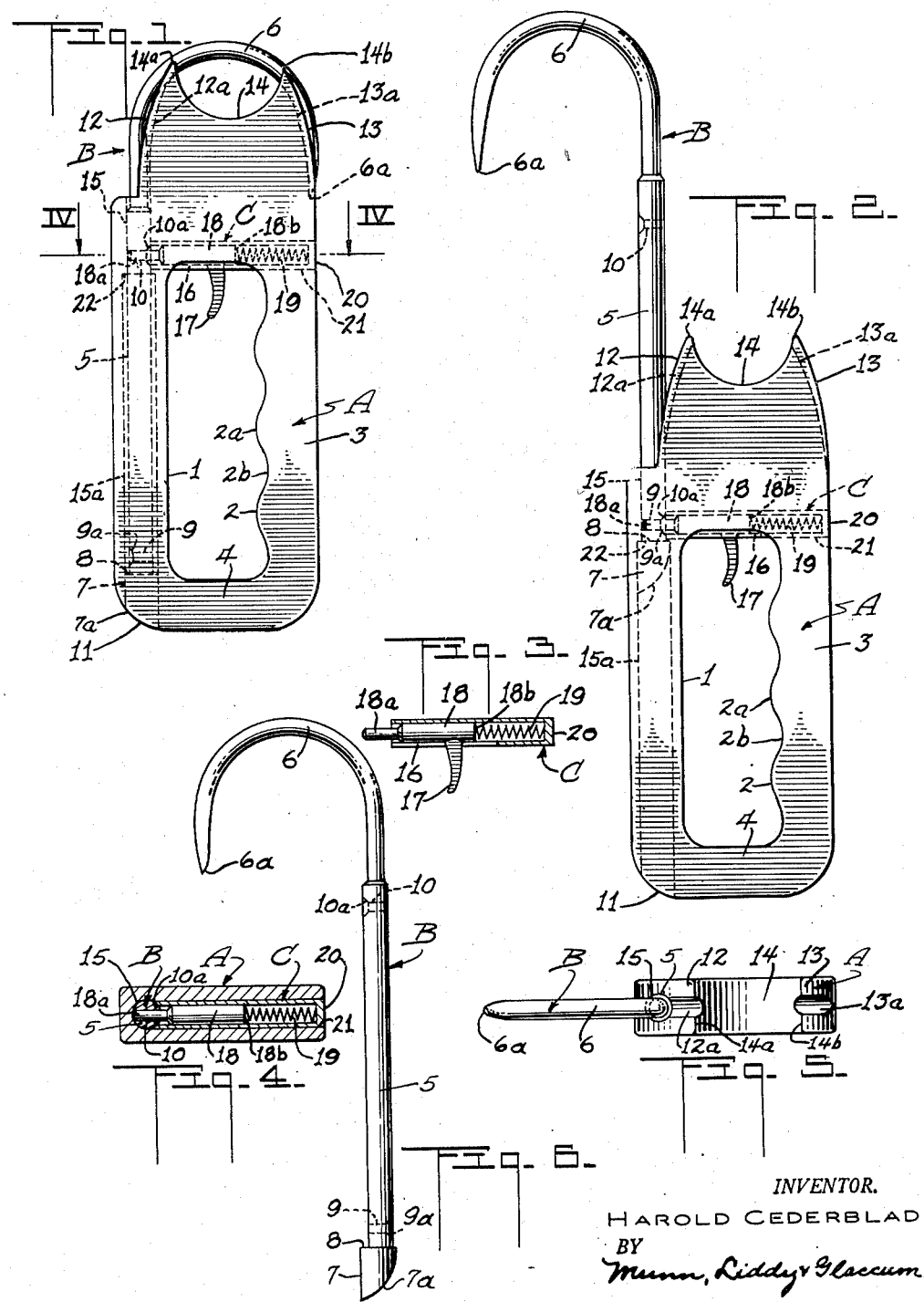

2,536,535

UNITED STATES PATENT OFFICE 2,536,535

RETRACTABLE SAFETY FISH GAFF AND HANDLE

Harold Cederblad, San Francisco, Calif.

Application July 2, 1946, Serial No. 681,085

5 Claims. (Cl. 294—82)

1

An object of my invention is to provide a retractable safety fish gaff and handle, which, when the gaff is retracted into the handle, the entire device can be safely carried in the pocket. The pointed end of the gaff is protected by the handle when the gaff is retracted.

A further object of my invention is to provide a retractable safety fish gaff and handle in which the handle encloses the hand that manipulates the device so as to prevent the hand from slipping off the handle during use.

A still further object of my invention is to provide a retractable safety fish gaff and handle in which the gaff is secured to the handle in extended or retracted position. Novel means is used for permitting the gaff hook to be swung about its axis through an angle of 180° from retracted or closed position to open position so that the handle will not interfere with the use of the hook when the gaff is extended into operative position.

The device is simple in construction and the parts are designed to make a pleasing appearance. The handle may be made of colored plastic to add to its beauty.

Other objects and advantages will appear in the following specification, and the novel features of the device will be particularly pointed out in the appended claims.

My invention is illustrated in the accompanying drawings forming a part of this application, in which:

Figure 1 is a plan view of the retractable safety fish gaff and handle showing the gaff in closed position;

Figure 2 is similar to Figure 1 excepting that the gaff is shown in extended position with the hook swung through an arc of 180°.

Figure 3 is a longitudinal section through the fish gaff securing means;

Figure 4 is a transverse section taken along the line IV—IV of Figure 1;

Figure 5 is a top plan view of Figure 2; and

Figure 6 is a view of the fish gaff.

While I have shown only the preferred form of my invention, it should be understood that various changes or modifications may be made within the scope of the appended claims without departing from the spirit and scope of the invention.

In carrying out my invention, I provide a handle indicated generally at A and this handle may be made of any material desired, such as wood, plastic, etc. The handle has an elongated opening 1 for receiving the hand of the operator and

2 the side 2 of the hand opening is provided with a wavy or corrugated edge 2a for forming finger receiving recesses 2b. The portion 3 of the handle is the part grasped by the fisherman when using the device and the closed end 4 prevents the fisherman's hand from accidentally slipping off from the handle.

I will now describe how the fish gaff indicated generally at B is operatively connected to the handle. The gaff has a shank 5 that is of a larger diameter than the portion forming the hook 6. In fact, the hook can have an end inserted in the shank and secured thereto in any suitable manner, or the two parts can be made integral. It is also possible to have the shank of the same diameter as the hook. The hook has a pointed end 6a for gaffing purposes and the shank has an enlarged end 7 providing a shoulder 8 between the end 7 and shank 5. The shank also has two transversely extending countersunk openings 9 and 10 with the countersunk portion 9a of the opening 9 facing in an opposite direction of the countersunk portion 10a of the opening 10. The purpose of this will be presently described. The enlarged end 7 has a curved surface 7a that lies flush with the curved portion 11 of the handle A when the gaff is in retracted position.

I provide novel means for protecting the pointed end of the gaff when the latter is retracted. Figure 2 illustrates the upper end of the handle A as having curved side portions 12 and 13, these portions being grooved at 12a and 13a, respectively. A recess 14 is also provided and is made large enough to receive the finger of the operator when the fish gaff is in retracted position.

Figure 1 shows the hook 6 of the fish gaff B retracted with the pointed end 6a received in the groove 13a. In this way the point of the gaff is protected and cannot harm the fisherman. The central portion of the hook 6 straddles the extremities 14a and 14b of the recess and cooperates with the recess for forming a finger-receiving opening. The shank 5 of the gaff is slidably received in a bore 15 provided in the handle A. The bore has an enlarged portion 15a in which the enlarged end 7 of the shank slides when the shank is extended or retracted.

The means for locking the gaff in retracted or extended position is shown in Figure 3 and this means comprises a cylinder C slotted at 16 for slidably receiving a trigger 17. The trigger is carried by a spring-pressed bolt 18 that has a reduced portion 18a for being received in either one of the countersunk openings 9 or 10. A coil spring 19 is mounted in the cylinder and has one end bearing against the closed end 20 of the cylinder while the other end bears against the inner end 18b of the plunger.

The cylinder C is placed in a transversely extending bore 21 provided in the handle A and extending from the side 3 of the handle to the bore 15. When the gaff hook is retracted, the opening 10 will register with the reduced portion 18a and the spring 19 will move the reduced end into the countersunk portion 10a of the opening for securing the gaff hook in retracted position. The hook cannot chatter with respect to the handle when retracted, because the shank 5 is received in the bearing 15 and the enlarged end 7 is received in the enlarged bore portion 15a.

In order to extend the gaff hook, the operator uses his first finger for pulling rearwardly on the trigger 17 and this will free the reduced portion 18a from the opening 10. The operator can now use his other hand and insert a finger in the opening provided by the hook 6 and the recess 14. The gaff may now be pulled outwardly and can be rotated through an arc of 180° to assume the position shown in Figure 2. As soon as the shoulder 8 on the gaff hook reaches the shoulder 22 formed by the juncture of the bore 15 with the enlarged portion 15a, the gaff hook will be prevented from moving any further into an extended position.

The opening 9 will now register with the reduced portion 18a and the spring 19 will move the plunger for causing the reduced portion to enter the countersunk portion 9a and secure the gaff in extended position. The fisherman can now use the gaff in the usual way and the hook 6 will not interfere with the handle A because it faces in an opposite direction to the recess 14. After the device has been used, it is a simple matter to retract the plunger 18 by pulling on the trigger 17 and then moving the gaff into retracted position, care being taken that the hook 6 is swung through an arc of 180° for aligning the hook with the grooves 12a and 13a. When the plunger locks the gaff in closed position the device is small enough to be placed in the pocket. The hook can do no damage because as previously stated the pointed end is protected by the groove 13a.

The handle protects the fisherman's hand from contacting the fish when using the gaff.

I claim:

1. In combination, a handle having an opening therein for receiving the hand and having a longitudinally-extending bore, a gaff having a shank slidable in the bore and having a hook, said handle having a groove for receiving the hook when the gaff shank is retracted in the bore whereby the handle protects the pointed end of the hook, the handle also having a recess for permitting access to the retracted hook for extending the gaff hook into operative position.

2. In combination, a handle having an opening therein for receiving the hand and having a longitudinally-extending bore, a gaff having a shank slidable in the bore and having a hook, said handle having a groove for receiving the hook when the gaff shank is retracted in the bore whereby the handle protects the pointed end of the hook, the handle also having a recess for permitting access to the retracted hook for extending the gaff hook into operative position, and means for securing the gaff shank in extended or retracted position.

3. In combination, a flat handle having a transversely-extending opening therein for receiving the hand and having a longitudinally-extending bore, a gaff having a shank slidably and rotatably received in the bore and having a hook, the handle having a curved groove in one end for receiving the hook when the shank is retracted in the bore, the hook and shank being rotatable through an arc of 180° when in extended position so the hook points away from the handle, and means for securing the gaff shank in extended position to prevent its rotation with respect to the handle.

4. In combination, a flat handle having a transversely-extending opening therein for receiving the hand and having a longitudinally-extending bore, a gaff having a shank slidably and rotatably received in the bore and having a hook, the handle having a curved groove in one end for receiving the hook when the shank is retracted in the bore, the hook and shank being rotatable through an arc of 180° when in extended position so the hook points away from the handle, means for securing the gaff shank in extended position to prevent its rotation with respect to the handle, said shank having an enlarged end, and means placed in the bore and contacting with the enlarged end when the shank is extended for limiting the movement of the shank into extended position.

5. In combination, a flat handle having a transversely-extending opening therein for receiving the hand and having a longitudinally-extending bore, a gaff having a shank slidably and rotatably received in the bore and having a hook, the handle having a curved groove in one end for receiving the hook when the shank is retracted in the bore, the hook and shank being rotatable through an arc of 180° when in extended position so the hook points away from the handle, and means for securing the gaff shank in extended position to prevent its rotation with respect to the handle, said gaff shank securing means being manually released for permitting the shank to be retracted, and including a spring-pressed trigger with a detent extending into the hand opening in the handle a short distance.

HAROLD CEDERBLAD.

REFERENCES CITED

The following references are of record in the file of this patent:

UNITED STATES PATENTS

| Number | Name | Date |
| --- | --- | --- |
| 1,278,100 | Bruning | Sept. 10, 1918 |
| 1,596,631 | Seibold | Aug. 17, 1926 |
| 1,636,889 | Woods | Oct. 9, 1928 |
| 1,818,474 | Gough | Aug. 11, 1931 |
| 2,214,660 | Darling | Sept. 10, 1940 |